Nov. 13, 1923.                                                          1,474,044
H. H. KNOTT ET AL
BUTTON BLANK SHELL SAWING MACHINE
Filed March 30, 1920        4 Sheets-Sheet 1

Witness
Lynn Latta

Inventors
Harry H. Knott
Carl Jo Jungbluth
Edwin B Hammer

By Owigs Bair Attys

Nov. 13, 1923.  
H. H. KNOTT ET AL  
1,474,044  
BUTTON BLANK SHELL SAWING MACHINE  
Filed March 30, 1920  4 Sheets-Sheet 2

Witness  
Lynn Latta

Inventors  
Harry H. Knott  
Carl J. Jungbluth  
Edwin B. Hammer  
By Owigo Cain Attys

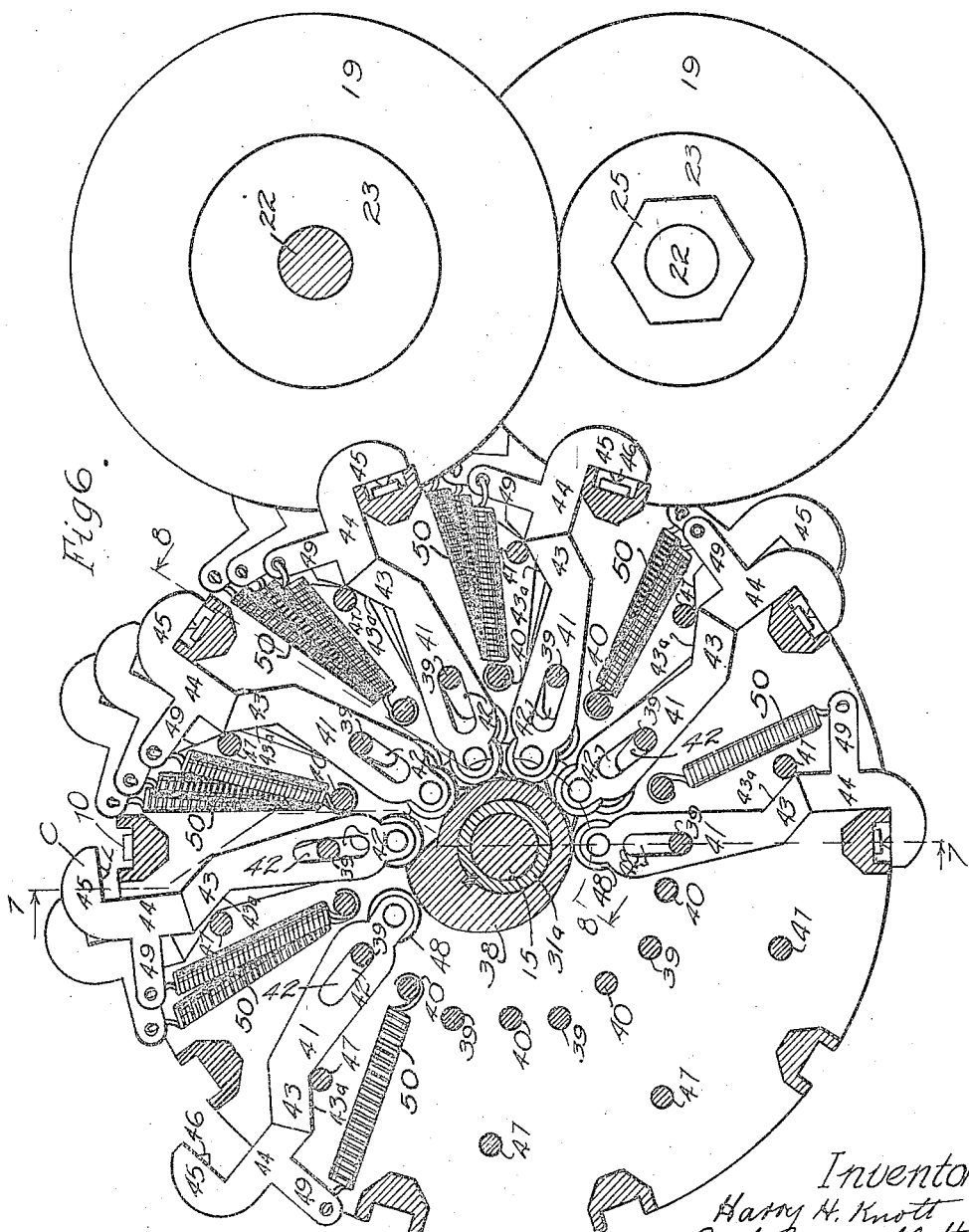

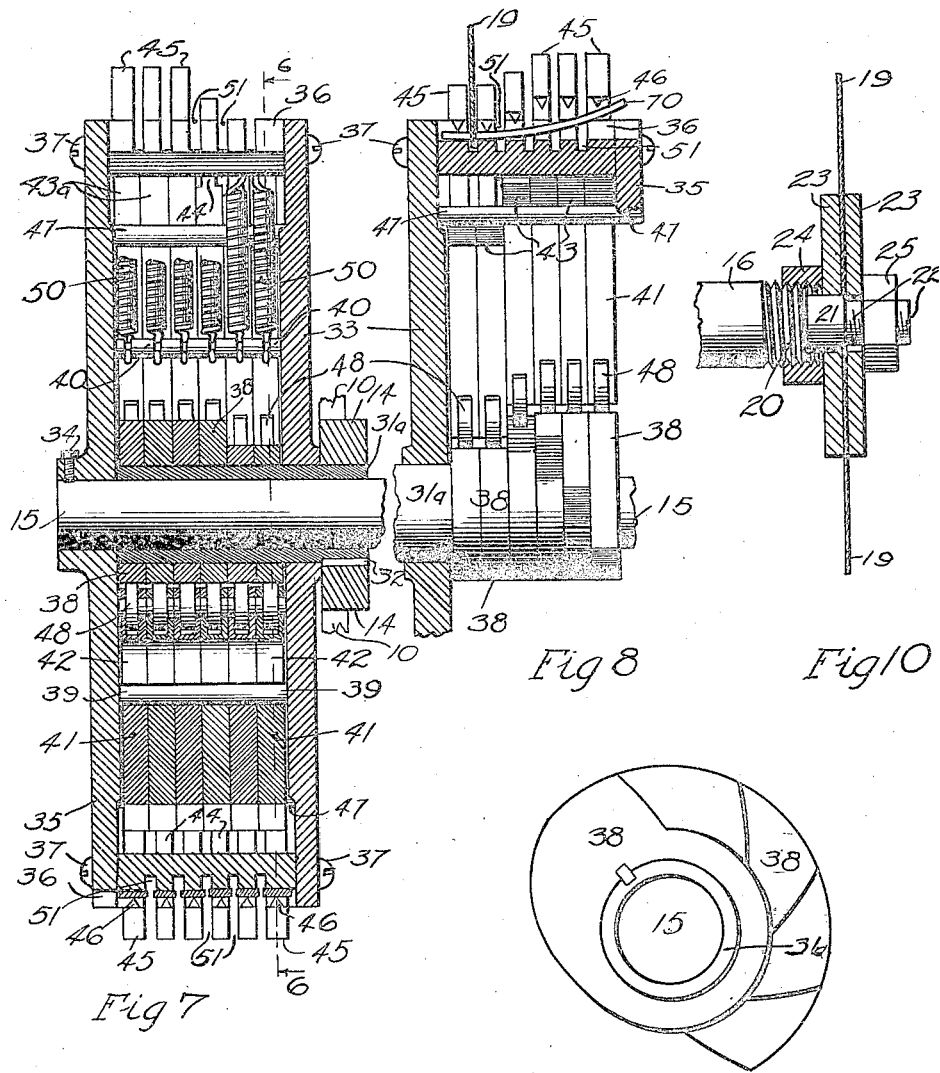

Patented Nov. 13, 1923.

1,474,044

UNITED STATES PATENT OFFICE.

HARRY H. KNOTT, CARL J. JUNGBLUTH, AND EDWIN B. HAMMER, OF WASHINGTON, IOWA, ASSIGNORS TO WASHINGTON MANUFACTURING COMPANY, A CORPORATION OF IOWA.

BUTTON-BLANK SHELL-SAWING MACHINE.

Application filed March 30, 1920. Serial No. 370,041.

*To all whom it may concern:*

Be it known that we, HARRY H. KNOTT, CARL J. JUNGBLUTH, and EDWIN B. HAMMER, citizens of the United States, and residents of Washington, in the county of Washington and State of Iowa, have invented a certain new and useful Button-Blank Shell-Sawing Machine, of which the following is a specification.

The object of our invention is to provide a button blank shell sawing machine especially adapted for sawing strips of shell into angular blanks used in making pearl buttons in the practice of a button making process such as that disclosed in our prior Patent No. 1,315,673, issued September 9, 1919, and in our co-pending application on a process for making pearl button blanks, Serial Number 351,180.

A further and more particular object is to provide a shell sawing machine adapted to receive and hold a strip or strips of shell and to cut them preferably in successive sawing operations into angular blanks.

Still a further object is to provide a process for cutting strips of shells into angular blanks involving the properly supporting of the strips, and successively bringing them into contact with members on a series of cutting devices, and a successive application of gripping members to the strips at different points in their lengths, so as to grip or hold the strips during the cutting operations.

With these and other objects in view our invention consists in the construction, arrangement and combination of the various parts of the device, whereby the objects contemplated are attained, as hereinafter more fully set forth, pointed out in our claims and illustrated in the accompanying drawings, in which:

Figure 6 is a detail, sectional view taken on the line 6—6 of Figure 7.

Figure 7 is a transverse, detail, sectional view taken on the line 7—7 of Figure 6.

Figure 8 is a detail, sectional view taken on the line 8—8 of Figure 6.

Figure 9 is an end elevation of the shaft and sleeve, illustrating the cam on the sleeve.

Figure 10 is a detail, sectional view illustrating the method of mounting the saws on the saw shaft.

Figure 1:
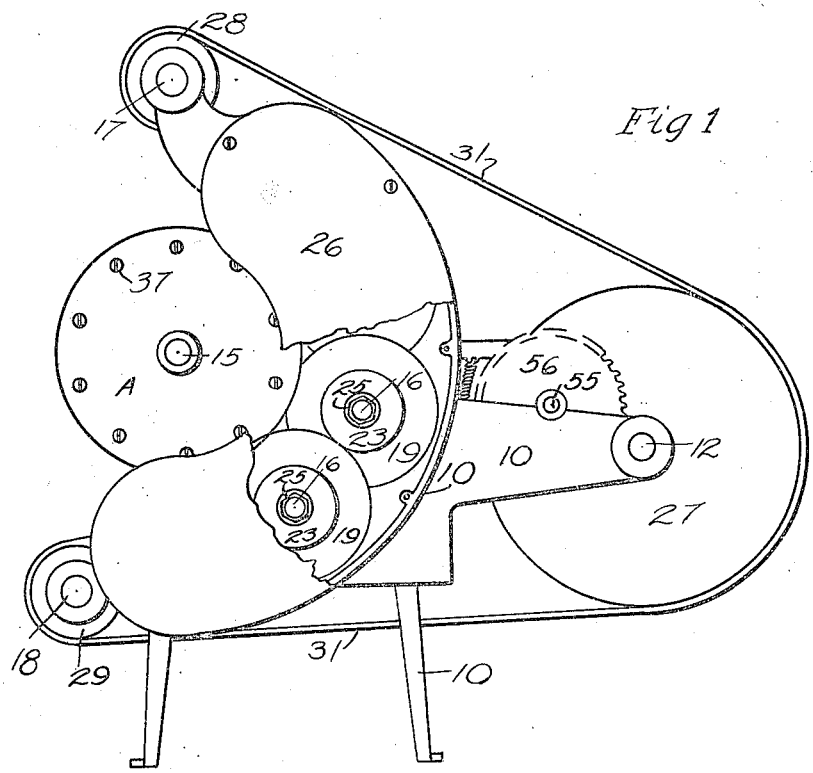
Figure 1 is a side elevation of a machine embodying our invention.

In the drawings herewith which illustrate our invention, we have employed the reference numeral 10 to indicate generally the supporting frame of our machine.

Mounted in suitable bearings 11 on the frame 10 at the rear part of the machine is a transverse shaft 12. On the shaft 12 is an ordinary belt pulley 13, which may be used in imparting rotary motion to said shaft.

Mounted in suitable bearings 14 near the central, forward portion of the machine is a transverse shaft 15. On the shaft 15 are one or more skeleton spools forming the shell strip holding devices. These shell strip holding devices are indicated generally in Figure 2 by the reference A.

Figure 2:
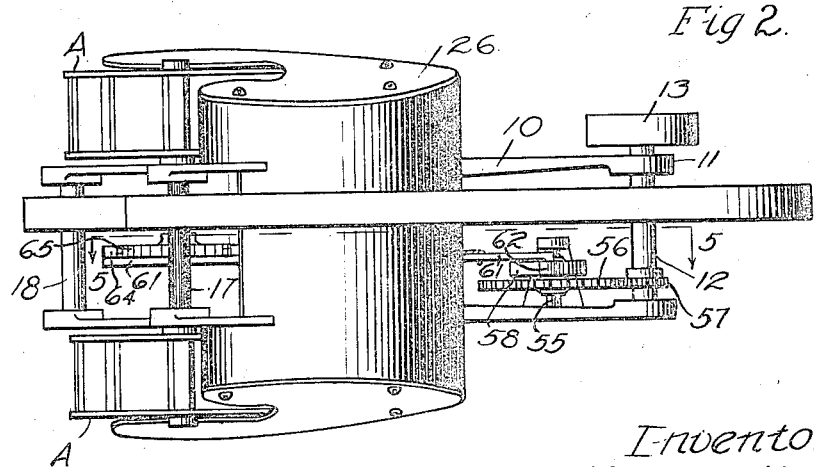
Figure 2 is a top or plan view of the same.
Figures 3, 4:
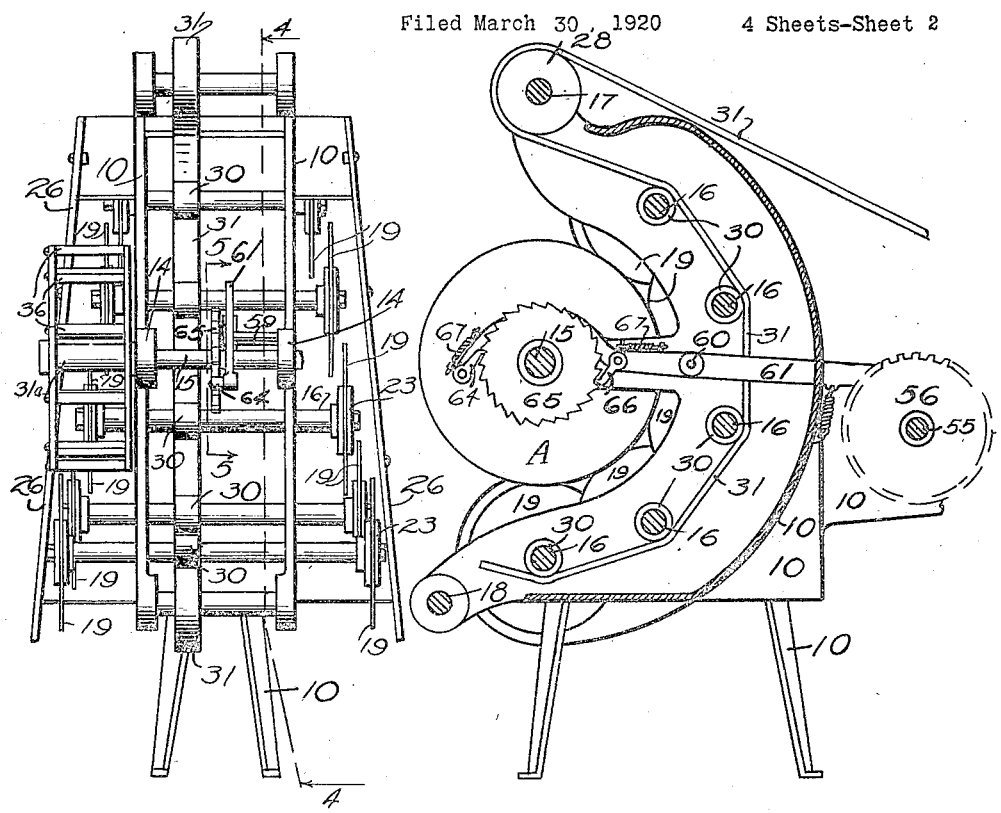
Figure 3 is a front elevation of our machine with parts broken away.
Figure 4 is a vertical, sectional view taken on the line 4—4 of Figure 3.
Figure 5:
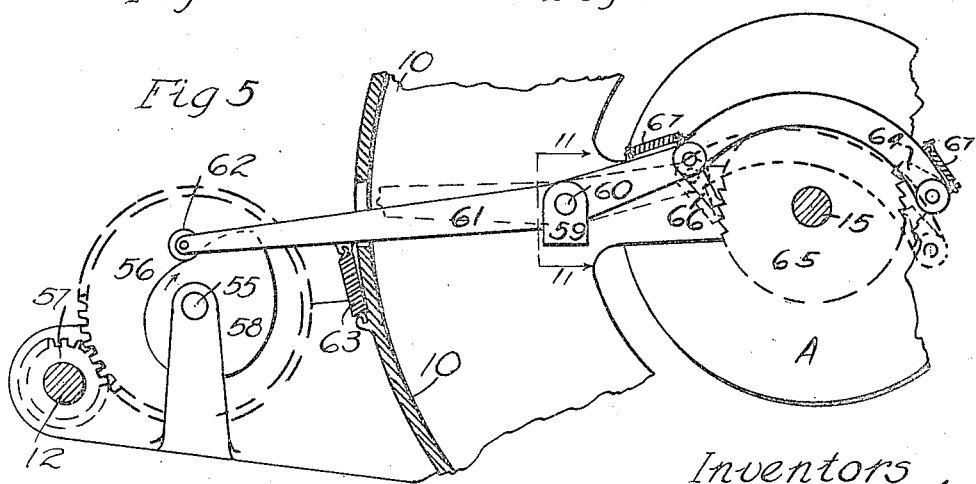
Figure 5 is a detail, sectional view taken on the line 5—5 of Figure 3.
Figure 11:
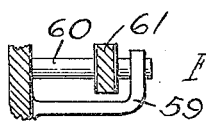
Figure 11 is a sectional view taken on the line 11—11 of Figure 5.

In Figures 2 and 3 we have shown simply the skeleton frame work of these blank holding devices.

In Figure 3 the blank holding device, at one end of the shaft 15, has been removed to permit a clearer view of the saws. For supporting the saws, we provide a series of shafts spaced from each other and arranged in substantially a half circle around the shaft 15. The saw shafts are indicated by the reference character 16.

Located above and forwardly with relation to the upper saw pulley 16 is a shaft 17. Located below and forwardly with relation to the lower saw pulley 16 is a shaft 18. On the saw shafts 16 we arrange a series of saws 19 for each strip holding device A. The saws 19 on each successive saw shaft 16 below the first or upper saw shaft are spaced laterally toward the outside of the machine, as clearly illustrated, for instance, in Figure 3. Thus for example, the upper saw of each series is nearest the center of the machine, and each successive lower saw is farther from the vertical center of the machine.

In Figure 10 we have illustrated a method of mounting the saws on their shafts. Each saw shaft 16 has near its end a screw-threaded portion 20. Beyond each screw-threaded portion 20 is a reduced size spindle 21, and beyond each spindle 21 is a screw-threaded reduced end 22. Each saw 19 has a central opening, and is preferably mounted between solid discs 23 of less diameter than the saws. On one side of each pair of discs 23 is a nut 24 internally screw-threaded to coact with the screw-threaded portion 20. The discs 23 and saws have registering openings or bores to receive the spindle 21. A nut 25 locks each saw on its shaft. The saws may be adjusted to proper position on their shafts by adjusting the nut 24 and nut 25.

The saws 19 are received within a suitable casing 26. Rotation is imparted to the saws 19 in the following manner:

On the shaft 12 is a large pulley 27. On the shafts 17 and 18, respectively, are pulleys 28 and 29. On the saw shafts 16 are pulleys 30. The pulleys 27, 28, 29 and 30 are arranged substantially in the same vertical plane. A belt 31 is extended around the pulley 27, and its upper stretch is then extended over the pulley 28, and thence rearwardly around the rear surfaces of the pulleys 30, thence around the pulley 29, and back to the pulley 27.

The pulley 27 is relatively large, and the pulleys 30 are relatively small, so that very rapid rotation may be imparted to the saws 19.

We shall now describe the construction of the shell holding devices A. On each end of the shaft 15 is a sleeve 31$^a$, keyed to the frame of the machine by means of a key 32. The shell holding devices on both sides of the machine are of similar construction, so we shall describe in detail only one of them.

Mounted on the shaft 15 adjacent to the inner end of the sleeve 31$^a$ is a disc 35 which is fixed to the shaft by means of a set-screw 34. Spaced from the disc 35 and rotatably mounted on the sleeve 31$^a$, adjacent to the frame of the machine is a second disc 33, having secured to its outer edge a plurality of circumferentially spaced laterally extending, outwardly opening shell strip holding channels or channeled bars 36. The disc 33 is secured to the end of the channels 36, by screws or the like 37. On the sleeve 31$^a$ between the discs 33 and 35 is a series of cams 38. Spaced outwardly from the cams 38 is a series of rods spaced from each other in a circle and supported by the discs 33 and 35, which rods are indicated by the reference characters 39.

Altering with the rods 39 and spaced slightly inwardly with relation thereto is a similar series of rods 40. For each shell strip holding channel 36 there is provided a series of gripping members which will now be described.

Each series of gripping members is mounted on one of the rods 39. Each gripping member comprises a bar 41 arranged substantially radially of the shell holding device A, and provided with an elongated slot 42 through which the rod 39 is extended, and which permits sliding and pivotal movement of the gripping member. At the outer end of each bar 41 is an inclined portion 43 from which there extends outwardly a portion 44 terminating in a projecting head 45 which has a gripping finger 46. (See Figure 6.)

One edge of each inclined portion 43 forms a cam 43$^a$ arranged to coact with a rod 47 mounted between the discs 33 and 35.

Each gripping device is designed to coact with one of the cams 38 and has at its inner end a roller 48 arranged in contact with its corresponding cam.

On each portion 44 is an arm 49 to which is connected a spring 50. The other end of each spring 50 is connected with one of the rods 40. The springs 50 yieldingly hold the gripping devices at the inward limit of their movement. Each channel 36 is provided with a series of grooves 51 to receive the edges of the saws. For imparting movement to the shell strip holding devices A, we have provided the following means:

Located on the frame forwardly of the shaft 12 is a shaft 55 on which is a gear 56 in mesh with a gear 57 on the shaft 12. On the shaft 55 is a cam 58. Mounted on the bracket 59 and on the frame of the machine between the shafts 55 and 12 is a stud 60 on which is pivoted between its ends a lever 61. On one end of the lever 61 is a roller 62. A spring 63 connected with the lever 61 and the casing 10 holds the roller 62 in contact with the cam 58.

Pivoted to the other end of the lever 61 is a pawl 64, arranged to coact with a ratchet 65 on the shaft 15. Pivoted to the lever 61 between the bracket 59 and the pawl 64 is a second pawl 66, also arranged to coact with said ratchet 65.

Springs 67 hold these pawls in operative position with relation to the ratchet.

The parts just described are so arranged that when the shaft 55 is rotated for thereby imparting motion to the cam 58, the rearward end of the lever 61 will be alternately raised and lowered by said cam and the spring 63.

When said end is raised, the pawl 66 will engage the ratchet 65 and impart to it rotation for advancing the ratchet one tooth.

On the other hand, when the rear end of the lever 61 is lowered, the pawl 64 will engage the ratchet 65 and impart to it rotation for moving it the distance of three teeth.

The cam 58 is of such shape that during the time when the pawl 66 is active, the cam moves for causing a considerable portion of its face to contact with the roller 62, so that the movement of the shell holding device A will be quite slow. On the other hand, the cam is of such shape that the movement imparted to the shell holding device A by the pawl 64 is considerably more rapid.

The purpose in alternately imparting to the shell holding device relatively slow movement and then relatively rapid movement is to move the shell holding device slowly, while the saws are operating and to move it more rapidly when the saws are not operating and when the next bit of shell is being brought to sawing position.

We shall now describe the practical operation of our improved machine, and in such description the construction of the machine will be made somewhat clearer.

In Figure 6, there is illustrated the various positions assumed by the shell strip holding members during the operation of the machine. When the shell holding device A is operated, there is a time in each revolution, when a set of the shell gripping members is held with all of said members at the outer limit of their movement, as illustrated at the upper left hand part of Figure 6.

When the shell holding device A rotates a little farther, the two inner shell gripping members begin to travel downwardly on their cam, as illustrated at C in Figure 6.

A little further along in the rotation of the shell holding device A, the two inner shell gripping members move to the inner position of their movement. In the meanwhile, a strip of shell 70 cut in some suitable way, as for instance on a machine of the type disclosed in our prior application, Serial Number 339,459, filed November 20, 1919, has been placed in the channel 36. When the two inner shell gripping members move to their inner position, the fingers 46 engage such strip of shell and hold it firmly in position in the channel.

The cams of the two inner shell gripping members are alike, so that they will operate simultaneously in the same way for gripping the strip of shell on opposite sides of the saw, which first operates on the shell.

The two inner shell gripping members are shown in different positions in Figure 8, and the third shell gripping member is shown as it has begun its inward movement.

The parts are so arranged and their operations are so synchronized that while the two inner shell gripping members hold the shell in the channel 36, the shell holding device A reaches the position where the upper saw 19 cuts off an angular blank from the end of the shell strip 70, as illustrated in Figure 8.

The sawing operation takes place, while the shell holding device A is being slowly rotated by means of the pawl 66.

Immediately after the sawing operation by the first saw has occurred, the parts operate for causing the pawl 64 to rotate the shell holding device A more rapidly to bring the shell strip to position for the second sawing operation. During such movement, the third shell gripping member from the inside is moved inwardly by its spring 50, while its inner end travels down the face of its cam.

It will be seen that the remaining portion of the shell strip is then gripped between the second and third gripping members for the second sawing operation. The shell holding device A then reaches position, where the second saw performs its work.

The sawing operations are successively continued until all of the saws have been passed, and the shell strip has been sawed up into angular blanks.

When the set of shell gripping members under consideration reach their innermost position, they are all at their inner position radially of the shell holding device A. As the shell holding device continues to rotate, the shape of the cam is such that the shell gripping members move radially outwardly for releasing the angular shell blanks.

Some changes may be made in the construction, and arrangement of the parts of our improved device without departing from the essential features and purposes of our invention, and it is our intention to cover by our claims any modified forms of structure or use of mechanical equivalents, which may be reasonably included within their scope.

We claim as our invention:

1. In a machine of the class described, a frame, a shell strip holding element mounted thereon for rotation, said element having at its periphery a plurality of circumferentially spaced transversely elongated channels for holding strips of shell, a plurality of saws having spaced cutting planes and their axes arranged in a semicircle on one side of said element, the parts being so arranged that when the element is rotated, the shell strips in each groove will be successively brought to position to be cut by the respective saws, and means for successively gripping each strip at points on opposite sides of the operative plane of each saw and for operating such gripping means in succession for each sawing position, the opposite side of said element being readily accessible to workmen.

2. In a machine of the class described, a frame, a shell strip holding element mounted thereon for rotation, said element having at its periphery a plurality of circumferentially spaced, transversely elongated channels for holding strips of shell, a plurality of saws having spaced cutting planes and their axes arranged in a semicircle on one side of said element, the parts being so arranged that when the element is rotated, the shell strips in each groove will be successively brought to position to be cut by the respective saws, and means for successively gripping each strip at points on opposite sides of the operative plane of each saw, and for operating such gripping means in succession for each sawing operation, a power shaft, means for operating the saws from the power shaft, a shaft for supporting said shell strip holding element, a ratchet thereon, a lever pivoted between its ends, pivoted pawls on said lever on opposite sides of said ratchet, and a roller on said lever, a cam on said first shaft arranged to coact with said roller, a spring for normally moving said lever to the limit of its movement in one direction, whereby intermittent rotary movement is imparted to said element, each alternate movement thereof being more rapid than each intermediate movement.

HARRY H. KNOTT.
CARL J. JUNGBLUTH.
EDWIN B. HAMMER.